(12) United States Patent
Kunz et al.

(10) Patent No.: US 6,822,416 B1
(45) Date of Patent: Nov. 23, 2004

(54) DEVICE FOR MONITORING THE MEASURING SYSTEM OF AN ELECTRIC DRIVE

(75) Inventors: Olaf Kunz, Grasellenbach (DE); Alfred Punzet, Erbach (DE); Gerhard Froehlich, Gerlingen (DE); Siegfried Melzer, Hoechst (DE)

(73) Assignee: Robert Bosch GmbH, Stuttgart (DE)

( * ) Notice: Subject to any disclaimer, the term of this patent is extended or adjusted under 35 U.S.C. 154(b) by 35 days.

(21) Appl. No.: 09/807,055

(22) PCT Filed: Aug. 2, 2000

(86) PCT No.: PCT/DE00/02548

§ 371 (c)(1),
(2), (4) Date: Jul. 9, 2001

(87) PCT Pub. No.: WO01/11747

PCT Pub. Date: Feb. 15, 2001

(30) Foreign Application Priority Data

Aug. 7, 1999 (DE) .......................................... 199 37 480
Jul. 22, 2000 (DE) .......................................... 100 35 783

(51) Int. Cl.[7] .............................................. H02P 5/28
(52) U.S. Cl. ...................... 318/700; 318/711; 318/714; 318/715; 318/721; 318/722
(58) Field of Search ................................. 318/700, 711, 318/714, 715, 721, 722, 609, 610, 432

(56) References Cited

U.S. PATENT DOCUMENTS

| | | | | |
|---|---|---|---|---|
| 3,919,609 A | * | 11/1975 | Klautschek et al. | 318/803 |
| 4,415,844 A | * | 11/1983 | Mendenhall et al. | 318/254 |
| 4,959,797 A | * | 9/1990 | McIntosh | 700/275 |
| 5,469,215 A | * | 11/1995 | Nashiki | 318/432 |
| 5,635,810 A | * | 6/1997 | Goel | 318/719 |
| 5,723,858 A | * | 3/1998 | Sugden | 250/231.13 |

FOREIGN PATENT DOCUMENTS

DE 43 30 823 8/1993

* cited by examiner

Primary Examiner—Rita Leykin
(74) Attorney, Agent, or Firm—Kenyon & Kenyon

(57) ABSTRACT

A device for monitoring a measuring system of an electric drive is described, including a measuring system (12) for detecting at least one measured quantity of an electric drive (10), at least one controller (78) which receives at least the measured quantity detected by the measuring system (12) and generates at least one manipulated variable for controlling the drive (10), where at least one signal acquisition (34, 73, 79, 89, 91, 93) is provided for detecting errors in the measuring system (12).

14 Claims, 7 Drawing Sheets

DEVICE FOR MONITORING THE MEASURING SYSTEM OF AN ELECTRIC DRIVE

BACKGROUND INFORMATION

The present invention relates to a device for monitoring a measuring system of an electric drive according to the definition of the species of the independent claim. German Patent 43 30 823 C2 describes a drive device having a safety device for special operation. In a special mode, a redundant safety device monitors the rotation speed of the motor to determine whether it is maintaining a preset maximum, interrupting the power supply to the motor when the rotation speed exceeds the preset maximum. To determine the rotation speed, two different signals are obtained, the first signal being obtained from a rotation speed sensor and the second signal being derived from the variation over time of the current measured by another sensor for this purpose in at least one phase lead to the motor. If the rotation speed detected exceeds a predetermined maximum, the power supply to the motor is interrupted by switching a circuit breaker upstream from a line rectifier and also disconnecting the power inverter. Monitoring a speed sensor on the basis of the current variation is load-dependent and therefore relatively inaccurate. The object of the present invention is to provide an improved monitoring system over the entire rotation speed range without requiring an additional rotation speed sensor.

ADVANTAGES OF THE INVENTION

The device according to the present invention for monitoring a measuring system of an electric drive includes at least one measuring system for detecting a measured quantity of an electric drive and at least one controller which receives at least the measured quantity detected by the measuring system and generates at least one manipulated variable to control the drive. At least one signal processor is provided for detection of errors in the measuring system. This yields early detection of errors in the drive system if there is an error in the measuring system.

In an expedient refinement, at least one quantity generated by the controller is sent to the signal processor for error detection in the measuring system. No additional signal acquisition is necessary for error detection due to a skillful choice of the controller quantity for analysis. Since the controller is available with the drive system anyway, the system's interference immunity can be improved by simple means.

In an expedient embodiment, the signal processor receives at least one quantity generated by the measuring system and/or derived therefrom for error detection in the measuring system. Including an additional quantity for analysis increases reliability in error detection. If multiple error detection options are provided in particular, analysis of the quantity supplied by the measuring system can be used for checking the plausibility of the error detection.

In another expedient embodiment, a measuring system model that generates at least one estimate expected for the measuring system is provided for error detection in the measuring system. Taking into account the estimate of the measuring system model further increases the reliability of the error detection and can also be used for a plausibility check.

A device according to the present invention for monitoring a measuring system of an electric drive is characterized in that a signal processor generates an error signal, as a function of the synchronous generated voltage, thus indicating an error in the measuring system. The synchronous generated voltage varies when the measuring system of the electric drive, e.g., a rotation speed sensor or a position sensor, slips and therefore there is a sensor offset. In particular, the flux-forming component of the synchronous generated voltage is suitable as a quantity for analysis. The sensor offset with respect to the rotor in comparison with the normal case changes the voltage induced in the field direction and is also available during ongoing operation of the electric drive. Countermeasures can be taken in due time if a faulty sensor arrangement is detected.

In an expedient embodiment, an output quantity of a direct-axis current controller is used to generate an error signal. Usually, to regulate a synchronous or asynchronous machine, a direct-axis current controller is usually provided for regulation of the flux-forming current component. Because of the additional (direct-axis) voltage component induced due to the sensor offset, a system deviation also develops with a direct-axis current controller.

Therefore, the integral component of the direct-axis current controller can be analyzed as a quantity indicating sensor offset in a measuring system, because the integral component is a measure of the additional direct-axis voltage induced due to the sensor offset. This quantity is available at the controller anyway and need not be generated separately.

An advantageous embodiment provides for the quantity indicating sensor offset to be compared with a limit value which depends on the controller parameters and/or the line parameters. System deviations may be caused in particular by the dead time voltage due to the switch dead time of the trigger stage, the induced synchronous generated voltage due to the dead time of the quadrature-axis current controller or parameter deviations in inductors and resistors, additionally affecting the integral component of the direct-axis current controller. Since the controller parameters and line parameters are approximately known, they can be taken into account in selecting the limit value with which the integral component of the direct-axis current controller is compared. This increases accuracy in error detection in the measuring system.

An alternative embodiment is characterized in that the acceleration of the drive derived from the output signal of the measuring system is analyzed. In the subsequent comparison with certain limit values, any lack of mechanical connection between the electric drive and the sensor is detected. In an expedient refinement, this monitoring is active only when the setpoint current preset by the drive controller reaches the maximum allowed setpoint current. In this case, a critical operating situation may be assumed, possibly caused by a defective measuring system. This embodiment is preferably carried out as a plausibility check in parallel with other sensor monitoring methods.

In an alternative embodiment, a rotation speed monitoring model is provided for monitoring a measuring system of an electric drive, generating an estimate of the output signal of the measuring system as a function of certain input quantities. If there are significant deviations with respect to the actual output signal of that measuring system, a defective measuring system is inferred.

In an expedient embodiment, a selector module is provided to select the monitoring function as a function of the estimated rotation speed. The rotation speed monitoring model is used at high rotation speeds. Since this is ineffective at low rotation speeds, direct-axis voltage monitoring is relied on for this case. This ensures that an error in the measuring system will be detected reliably in any rotation speed range.

Additional expedient embodiments are derived from additional dependent claims and from the description.

DRAWING

The embodiments of the present invention are illustrated in the drawing and are described in greater detail below.

DESCRIPTION OF EMBODIMENTS

Figure 1:
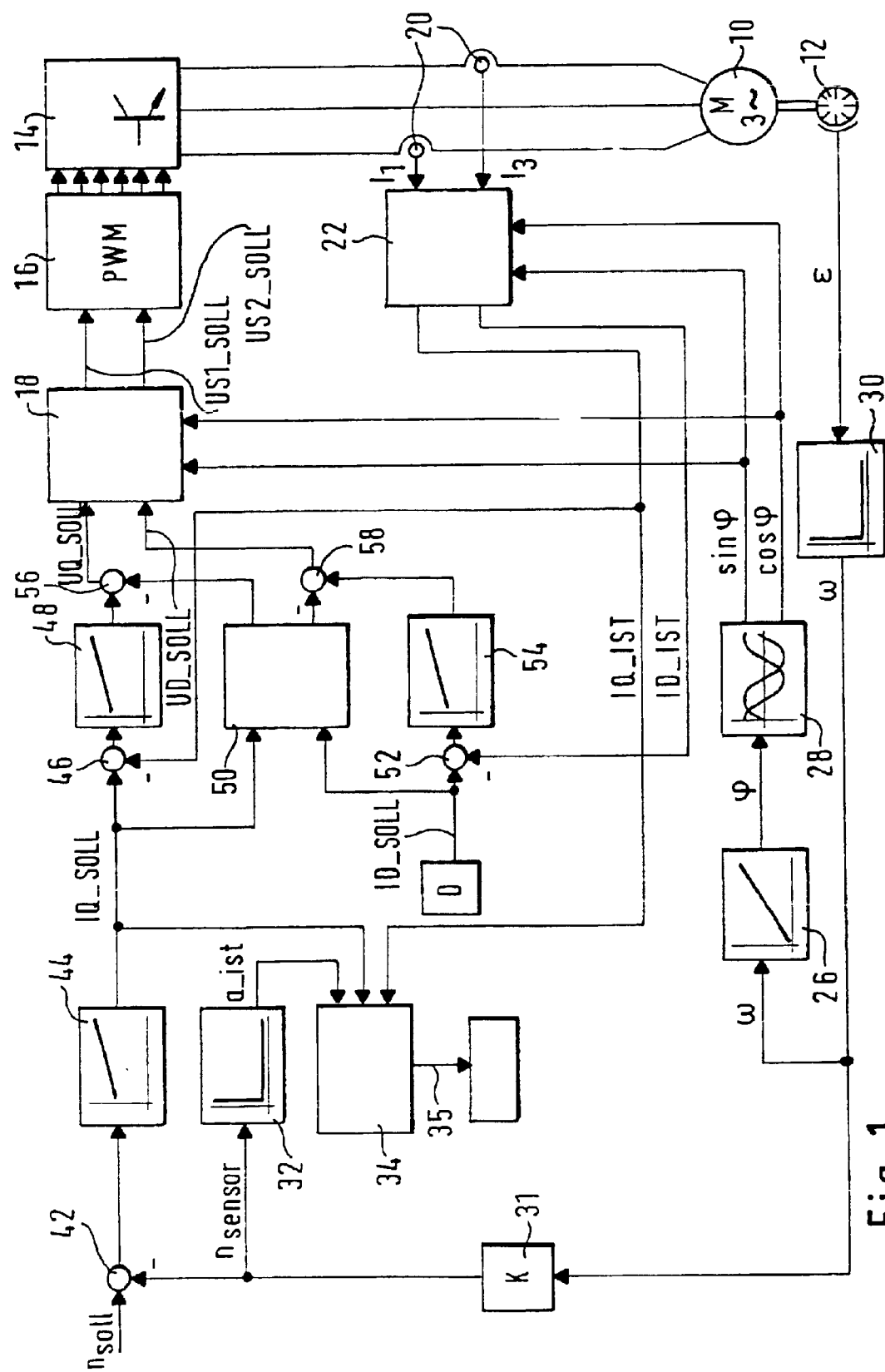
FIG. 1 shows a controller structure having a monitoring device of a synchronous machine.

A rotation speed-position sensor 12 as a measuring system detects the angular displacement of an electric drive 10, namely a synchronous machine in the first embodiment according to FIG. 1. A converter 14 driven by a pulse width modulator 16 supplies with current the three phases of electric drive 10. Current sensors 20 whose output signals 11, 13 are sent to an input transformer 22 are provided in taco of the three phases. Input transformer 22 generates a quadrature-axis current actual value IQ_IST and a direct-axis current actual value ID_IST. Quantity ω from which a direction angle φ is formed by an integrator 26 is obtained over a first differentiator 30 to which the angular displacement is sent. A sine-cosine generator 28 supplies corresponding sin(φ) and cos(φ) values to input transformer 22 and output transformer 18 from direction angle φ. By way of a converter 31, a sensor rotation speed actual value n_sensor is formed from the output quantity of first differentiator 30 and sent (with a negative sign) to a second differentiator 32 and a second summation point 42. The output signal of second differentiator 32 functions as an input quantity for a circuit component labeled as a plausibility check 34. Plausibility check 34 generates a plausibility error signal 35. A speed controller 44 forms a quadrature-axis current setpoint value IQ_SOLL from the rotation speed deviation available at second summation point 42 between rotation speed setpoint n_soll and a sensor rotation speed actual value n_sensor and sends it to a third summation point 46, plausibility check 34 and a buffer 50. Quadrature-axis current actual value IQ_IST formed by input transformer 22 is used as an input quantity for plausibility check 34 and (with a negative sign) for third summation point 46. The system deviation of quadrature-axis current setpoint value IQ_SOLL and quadrature-axis current actual value IQ_IST is sent to a quadrature-axis current controller 48 designed as a PI controller. The system deviation of direct-axis current setpoint ID_SOLL and direct-axis current actual value ID_IST, generated by input transformer 22 is available at a fourth summation point 52 as an input quantity for a direct-axis current controller 54, also designed as a PI controller. Direct-axis current setpoint ID_SOLL assumes a value of zero for the synchronous machine. It is also sent to buffer 50. At a fifth summation point 56, an output quantity of buffer 50 is subtracted from the output signal of quadrature-axis current controller 48, yielding a quadrature-axis voltage setpoint value UQ_SOLL. Similarly, a direct-axis voltage setpoint UD_SOLL is generated at a sixth summation point 58. Quadrature-axis voltage setpoint UQ_SOLL and direct-axis voltage setpoint UD_SOLL form input quantities for output transformer 18. Output transformer 18 converts these values together with sin(φ) and cos(φ) into two additional voltage setpoints US1_SOLL, US2_SOLL which are sent to pulse width modulator 16.

Figure 2:
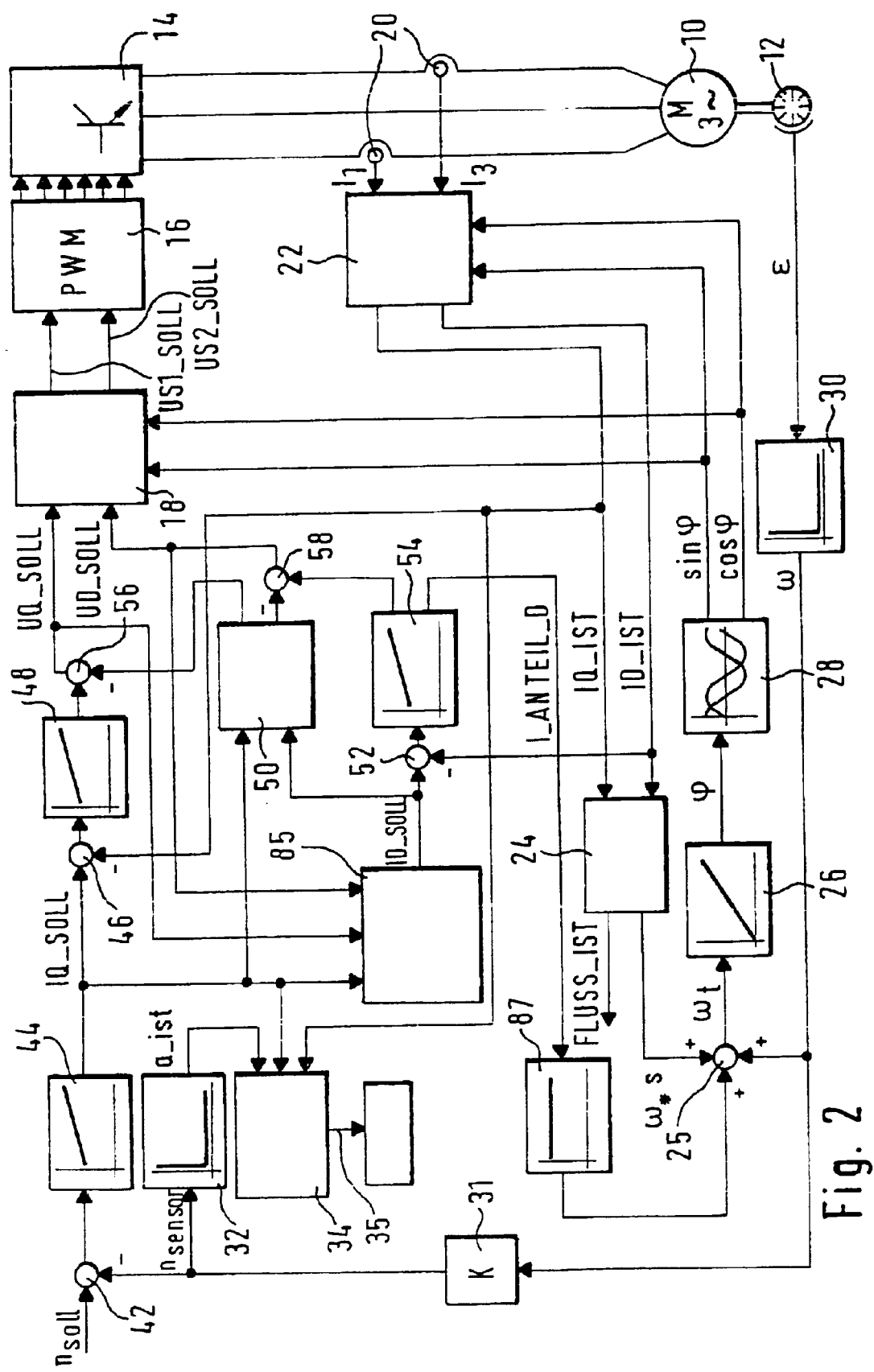
FIG. 2 shows a controller structure having, a monitoring device of an asynchronous machine.

The block diagram according to FIG. 2 shows the controller structure of an asynchronous machine. It is essentially identical to the controller structure of the synchronous machine shown in FIG. 1 except that direct-axis current setpoint ID_SOLL is no longer set at a value of zero, but instead an output quantity of a voltage controller 85. Voltage controller 85 receives as input quantities quantrature-axis current setpoint value IQ_SOLL, quadrature-axis voltage setpoint UQ_SOLL and direct-axis voltage setpoint UD_SOLL. Integral component I_ANTEIL_D of direct-axis current controller 54 is sent to a direct-axis voltage controller 87 whose output quantity is used at summation point 25 as an input quantity in addition to slip ω·s and the output quantity of flux model 24.

Figure 3:
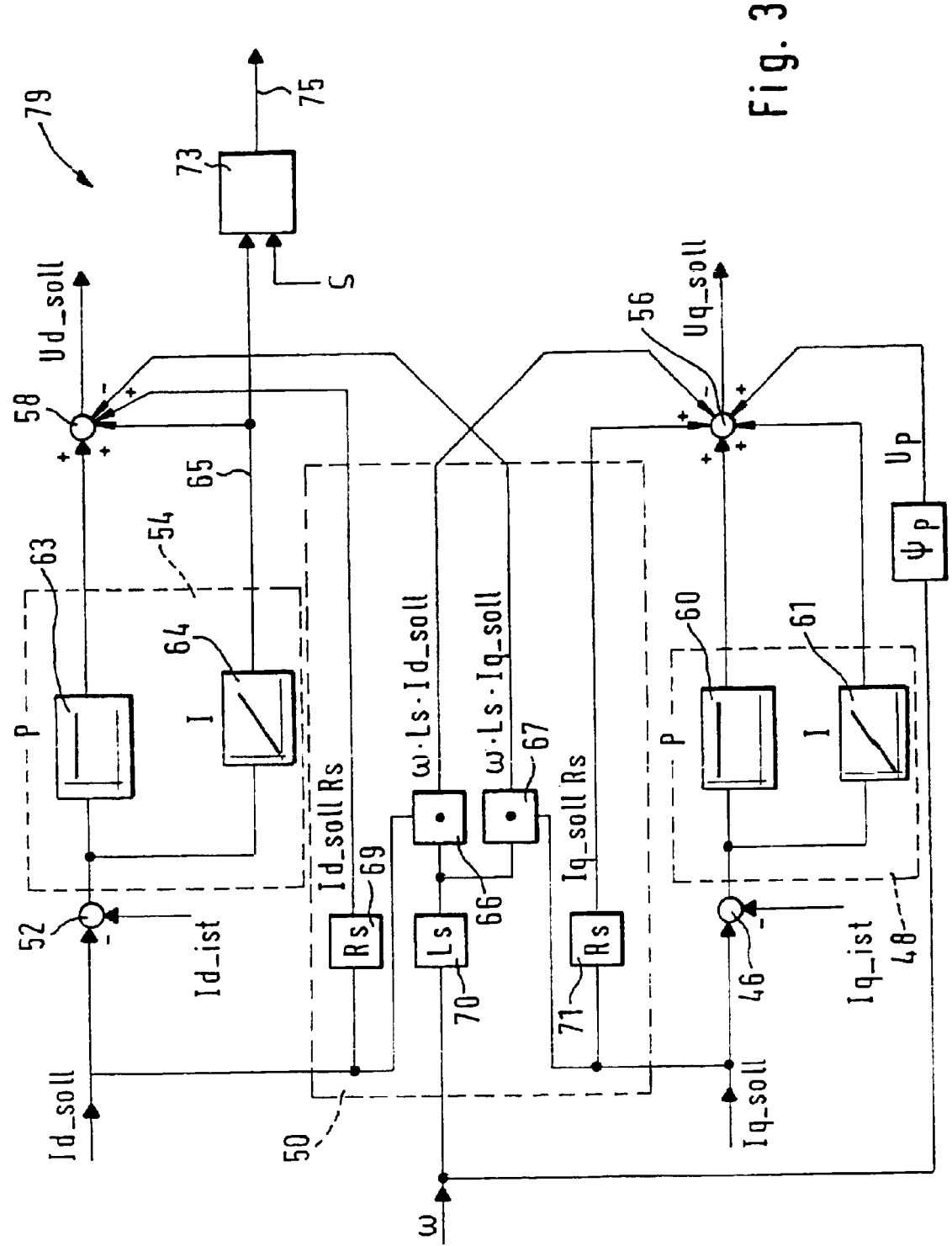
FIG. 3 shows a block diagram of direct-axis voltage monitoring.

The embodiment according to FIGS. 1 and 2 is expanded and made more precise in FIG. 3. Quadrature-axis current controller 48 can be represented by a parallel circuit of a proportioned component 60 and an integral component 61 of quadrature-axis current controller 48. Direct-axis current controller 54 is composed of a parallel-connected proportional component 63 and an integral component 64. The output of integrator 64 of direct-axis current controller 54 is sent to a comparator 73 which receives a limit value (i and generates a direct-axis voltage error signal 75. Multiplying angular velocity ω (angular velocity of the d-q coordinate system) by interlinked flux Ψp yields a synchronous generated voltage Up, which is sent to fifth summation point 56. Buffer 50 is implemented by a first proportional element 69 (stator resistor $R_S$), a second proportional element 70 (stator inductor $L_S$) and a third proportional element 71 (stator resistor $R_S$) and two multipliers 66, 67.

Figure 4:
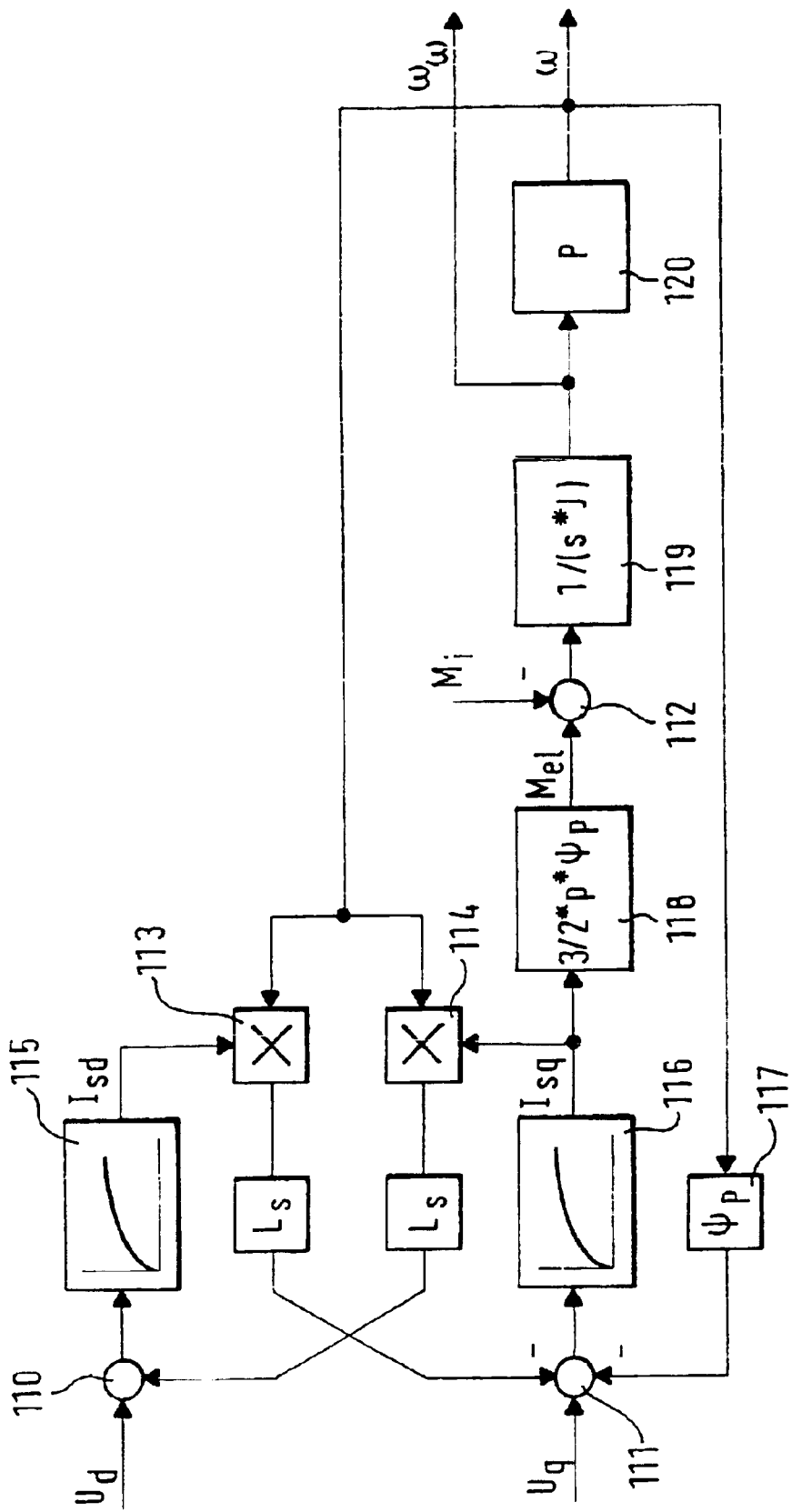
FIG. 4 shows a control engineering equivalent circuit diagram of the synchronous machine in the normal case.

In the case of the control engineering equivalent circuit diagram of the synchronous machine in the normal case according to FIG. 4, a direct-axis voltage Ud of the drive is sent to a tenth summation point 110. From the output quantity of tenth summation point 110, a PT1 direct-axis component 115 forms a direct-axis current Isd of the drive which is used by a third multiplier 113 as an input quantity in addition to angular veloeity ω (angular velocity of the d-q coordinate system). The output quantity of third multiplier 113 weighted with stator inductance $L_S$ is used, in addition to a quadrature-axis voltage Uq of the drive and a negative synchronous generated voltage Up (formed from the product of angular velocity ω and a magnetic flux $\Psi_p$) with a negative sign as an input quantity by an eleventh summation point 111. A PT1 quadrature-axis component 116 determines a quadrature-axis current Isq of the drive from the output quantity of eleventh summation point 111. A proportionality factor 118 ($3/2 \cdot P \cdot \Psi_p$) which takes into account the number of pole pairs p and magnetic flux $\Psi_p$ forms from this an electric moment Mel from which a load moment Mi is subtracted in a twelfth summation point 112. The resulting quantity is processed by an integrator 119, weighted with a reciprocal of the mass inertia moment J to yield angular velocity ωm of the rotor. If angular velocity ωm of the rotor is multiplied by the number of pole pairs p (reference number 120). this yields angular velocity ω (angular velocity of the d-q coordinate system), which is sent as a second input quantity to two multipliers 113, 114. The output quantity of a fourth multiplier 114 weighted with stator inductance $L_S$ is used as an input quantity by tenth summation point 110.

The control engineering equivalent circuit diagram of the synchronous machine in the event of an error according to FIG. 5 differs from the normal case illustrated in FIG. 4 as follows. Now only synchronous generated voltage Up (Up= ω·$\Psi_p$) weighted with a factor cos(α) 117' is returned as a negative value to eleventh summation point 111, where α is the offset angle of rotation speed-position sensor 12, with respect to its original arrangement in error-free operation. Due to sensor offset α, synchronous generated voltage Up weighted with a factor sin(α) 121' also goes to tenth summation point 110. The effects of sensor offset α are also reflected in proportionality factor 118' with factor cos(α).

Figure 6:
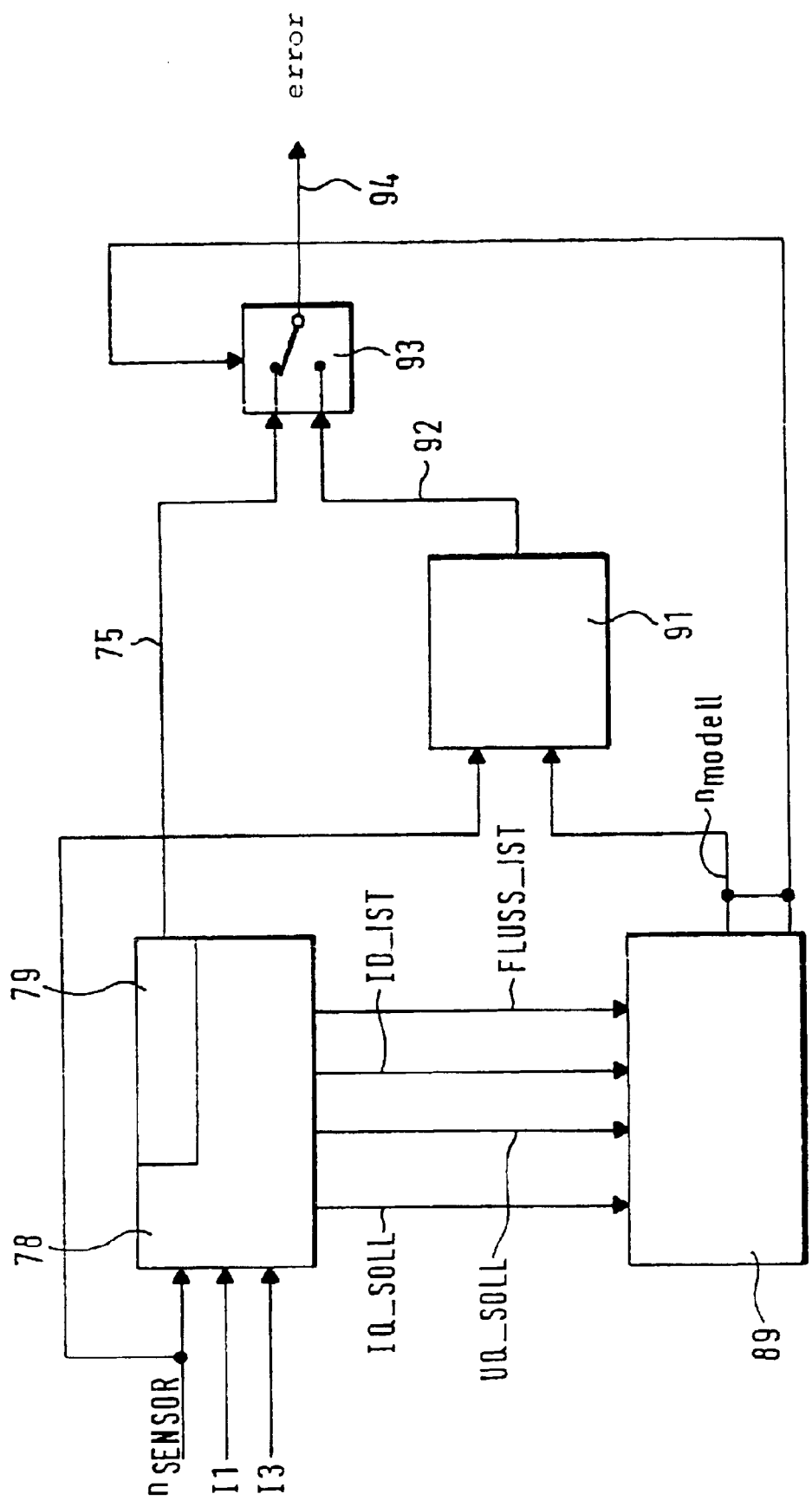
FIG. 6 shows a block diagram of the monitoring device for the asynchronous machine.

FIG. 6 shows the monitoring concept of the asynchronous machine. Direct-axis voltage monitor 79 shown in FIG. 3 is integrated into controller 78 according to FIG. 2. In addition, a rotation speed monitoring model 89 is provided as a measuring system model which receives quadrature-axis voltage and quadrature-axis current setpoints UQ_SOLL, IQ_SOLL, direct-axis current actual value ID_IST and the flux actual value. As an output quantity, rotation speed monitoring model 89 supplies estimated rotation speed n_modell to a comparator 91 and a reversing switch 93. Reversing switch 93 receives a model error signal 92 as an output signal of comparator 91 and direct-axis voltage error signal 75 as the output quantity of comparator 73 of direct-axis voltage monitor 79 according to FIG. 3.

Figure 7:
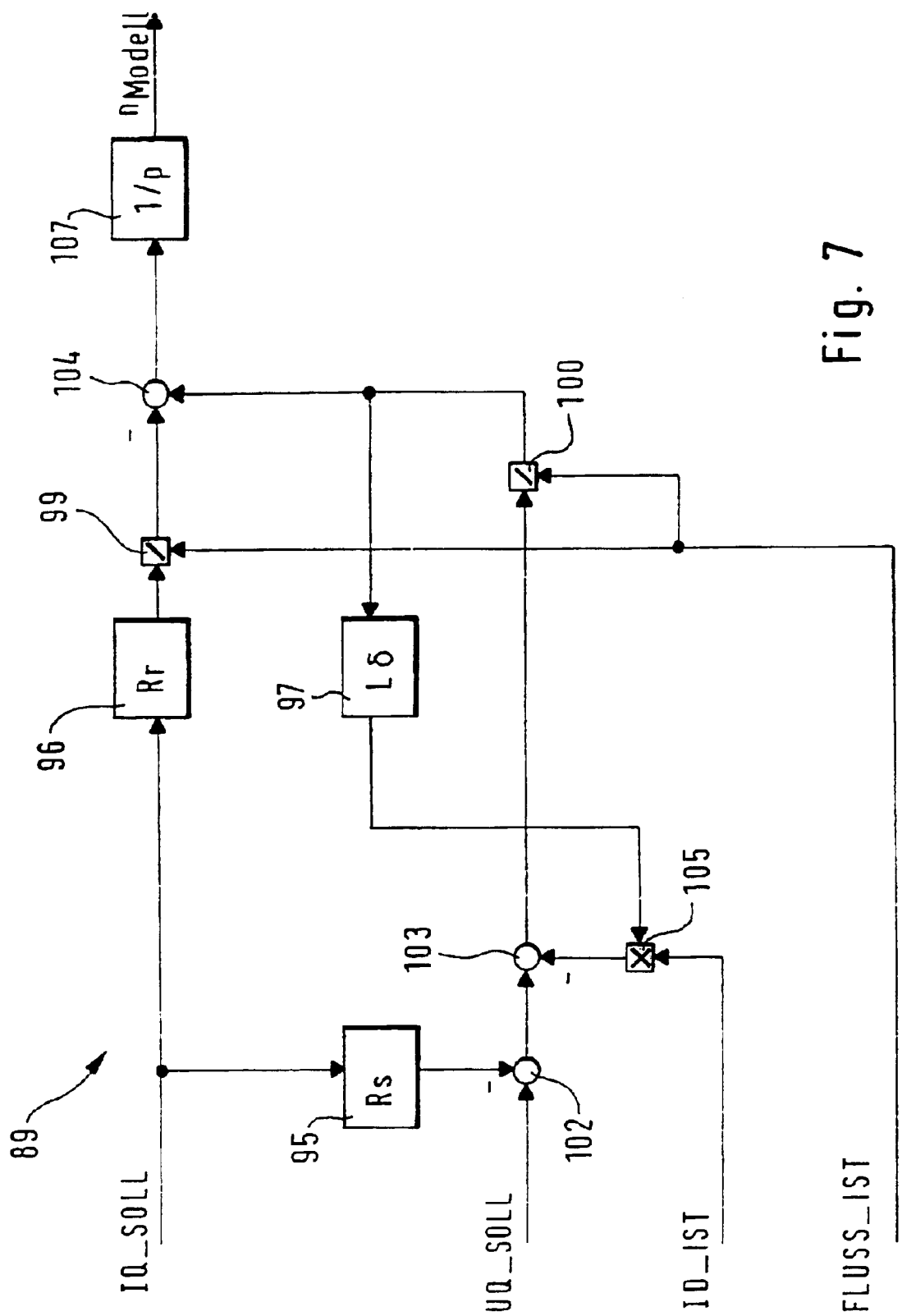
FIG. 7 shows a rotation speed monitoring model.

FIG. 7 shows rotation speed monitoring model 89 in greater detail. Quadrature-axis current setpoint value IQ_SOLL, weighted using a proportional element "rotor resistor" 96, goes to a first divider 99 and over a proportional element "stator resistor" 95 with a negative sign to a seventh summation point 102. Seventh summation point 102 also receives quadrature-axis voltage setpoint UQ_SOLL as an input quantity and supplies the resulting output quantity to an eighth summation point 103. The actual flux value is sent to a first divider 99 and a second divider 100. The output quantity of first divider 99 is sent to a ninth summation point 104. Second divider 100 receives as an additional input quantity the output quantity of eighth summation point 103 and supplies its output quantity to ninth summation point 104 (with a negative sign) and (weighted with a proportional element "leakage inductance" 97) to a multiplier 105. As an additional input quantity, multiplier 105 receives quadrature-axis current actual value IQ_IST and delivers the resulting output quantity with a negative sign to eighth summation point 103. An integrator 107 processes the output quantity of ninth summation point 104 to yield an estimated rotation speed n_modell.

According to the theory of field-oriented control of a synchronous or asynchronous machine, stator current 11, 13 detected by current sensors 20 can be divided into two components, namely quadrature-axis current actual value IQ_IST and direct-axis current actual value ID_IST, after conversion to a rotor-based orthogonal two-phase system (d-q coordinate system). Direct-axis current component ID builds up the magnetic field of the machine and is oriented in the same direction as the field. Quadrature-axis current IQ is perpendicular to direct-axis current ID and together with it forms the resultant current which rotates with rotational frequency ω of the field. Quadrature-axis current IQ_IST forms the torque of electric drive 10, while direct-axis voltage ID_IST is the flux-forming current component.

Plausibility check 34 described below monitors the rotation speed control circuit for plausible acceleration data when quadrature-axis current setpoint value IQ_SOLL reaches maximum current $I_{max}$ which can still be output by speed controller 44. The drive system receives a maximum torque. By differentiating the output signal of rotation speed-position sensor 12 twice, actual acceleration a_ist is obtained. An error signal is generated if actual acceleration a_ist is less than a preselectable minimum acceleration. Electric drive 10 could be in a blocked state. A corresponding display with the error message "blocked" may be provided. An error message is also generated if actual acceleration a_ist does not have the same sign as quadrature-axis current setpoint IQ_SOLL. In this case, rotation speed-position sensor 12 might be twisted or the motor leads might be connected incorrectly. An interruption in power supply to drive 10 can be detected on the basis of quadrature-axis current actual value IQ_IST if no quadrature-axis current actual value IQ_IST can be determined despite a maximum allowed quadrature-axis current setpoint value IQ_SOLL. Plausibility check 34 is used in particular for rapid response to an incorrectly adjusted rotation speed-position sensor 12 or to lack of mechanical coupling between rotation speed-position sensor 12 and drive 10.

Subsequent direct-axis voltage monitoring 79 according to FIG. 3 is used in particular to determine a slipping rotation speed-position sensor 12. A slipping rotation speed-position sensor 12 indicates a rotation speed deviating from the actual rotation speed of drive 10. For the synchronous machine, rotation speed-position sensor 12 is normally set to drive 10 so that the rotor and the stator resistance axis of phase U are in opposition at a measured angular displacement of 0°. A loose screw joint of rotation speed-position sensor 12 causes the rotor position to no longer correspond to the imaginary longitudinal axis of the current controller.

In this case, the coordinate system of the current controller based on the rotor is twisted toward the rotor by sensor offset α. For further calculation, it is assumed for the sake of simplicity that sensor offset α relative to angular displacement ε hardly changes at all (α=const).

Coordinate System Based on the Stator

| Normal case | Error case |
|---|---|
| $\alpha = 0$ | $\alpha$ constant $\neq 0$ |
| $\underline{\Psi}_p = \Psi_p * e^{j\varepsilon}$ | $\underline{\Psi}_p = \Psi_p * e^{j(\varepsilon+\alpha)}$ |
| (1.1) | (1.2) |
| $\underline{U}_p = j\Psi_p * e^{j\varepsilon} * \frac{d\varepsilon}{dt}$ | $\underline{U}_p = j\Psi_p * e^{j\varepsilon} * \frac{d\varepsilon}{dt}$ |

Coordinate System Based on the Rotor

| Normal case | Error case |
|---|---|
| $\underline{U}'_p = U_p * e^{-j\varepsilon}$ | $\underline{U}'_p = U_p * e^{-j(\varepsilon+\alpha)}$ |
| $\underline{U}'_p = j\Psi_p * e^{j\varepsilon} * \frac{d\varepsilon}{dt}$ | $\underline{U}'_p = j\Psi_p * e^{j(\varepsilon+\alpha)} * \frac{d\varepsilon}{dt}$ |
| (1.3) | (1.4) |

$$\underline{U}'_P = jU_P \qquad \underline{U}'_P = jU_P[\cos(\alpha) + \sin(\alpha)]$$

Control Engineering Model in Fixed Rotor Components

Figure 5:
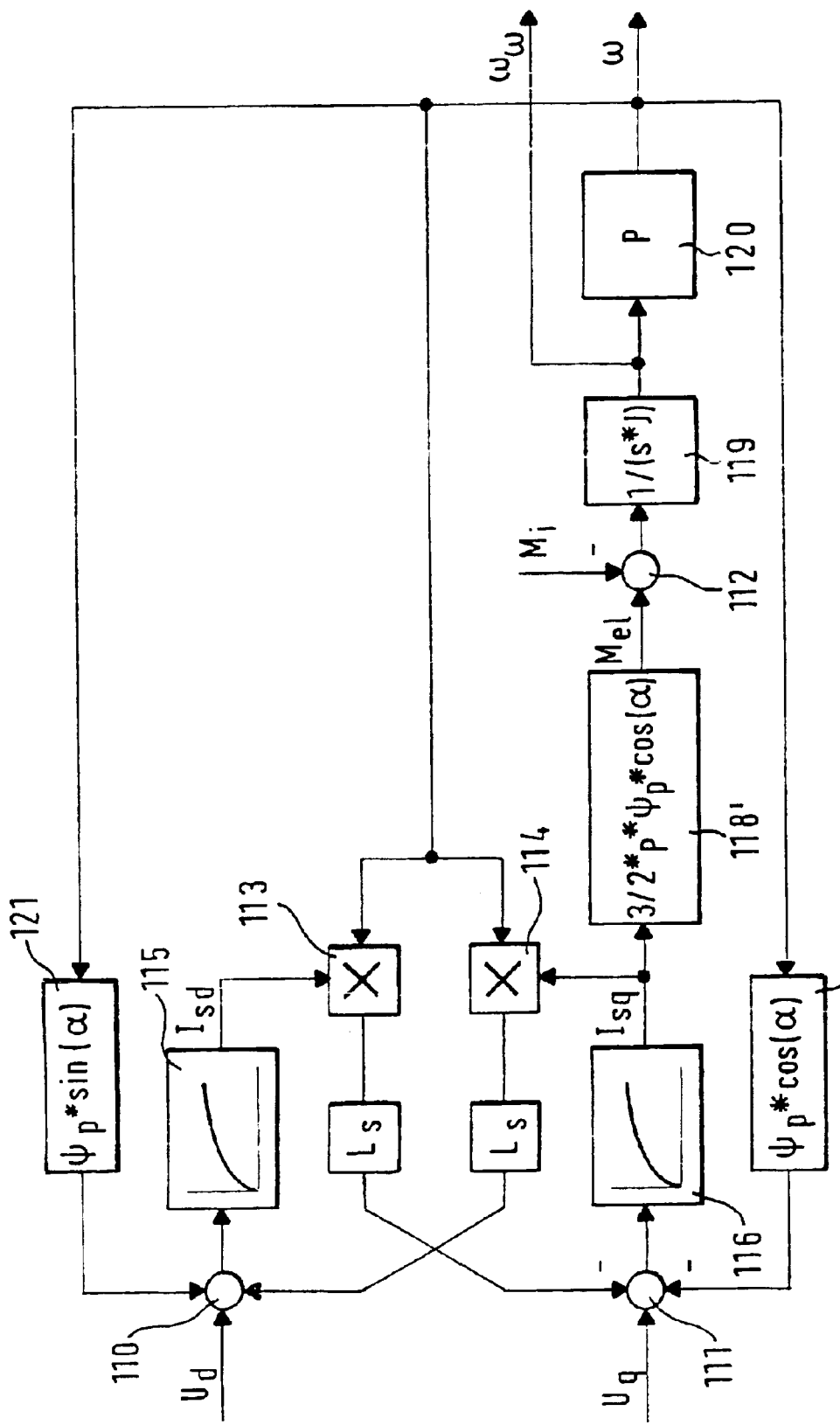
FIG. 5 shows a control engineering equivalent circuit diagram of the synchronous machine in the case of an error.

With reference to FIG. 4 (control engineering equivalent circuit diagram of the synchronous machine in the normal case) and FIG. 5 (control engineering equivalent circuit diagram of the synchronous machine in the error case), the following equations are obtained for the two cases:

Normal Case $$U_d = R_S * I_{SD} + L_S \frac{dI_{sd}}{dt} - \omega * L_S I_{sq} \qquad (1.5)$$

$$U_q = R_S * I_{sq} - L_S * I_{sd} + U_P$$

Error Case $$U_d = R_S * I_{Sd} + L_S \frac{dI_{sd}}{dt} - \omega * L_S I_{sq} - U_P \sin(\alpha) \qquad (1.6)$$

$$U_q = R_S * I_{sq} - L_s \frac{dI_{sd}}{dt} - \omega * L_S I_{sd} + U_P \sin(\alpha)$$

where $I_{sq}$, $U_q$ quadrature-axis current and voltage component of the drive $I_{Sd}$, $U_d$ current and voltage component of the drive ω angular velocity of the d-q coordinate system $\Psi_P$ magnetic flux generated by the permanently excited rotor Ls stator inductance Rs stator resistance In the normal case (α=0, no offset of rotation speed-position sensor 12 ), the d-q coordinate systems of controller 78 and drive 10 are identical. If the response characteristic of converter 14 is disregarded, components UD_SOLL and UQ_SOLL preset by controller 78 correspond to voltages components Ud and Uq, respectively, of drive 10.

In the event of an error (α≠0), the d-q coordinate systems of controller 78 and drive 10 are no longer identical. The quadrature-axis components and direct-axis components (Ud. Isd, Uq, Isq) in the drive deviate from those in controller 78 (UD_SOLL, ID_SOLL, UQ_SOLL, IQ SOLL) because of the sensor offset (α≠0). Angular velocity ωm of the rotor is detected by slipping rotation speed-position sensor 12, and after multiplying by the number of pole pairs p according to FIG. 3, it is sent as angular velocity ω to direct-axis voltage monitoring 79. Induced voltage $\Psi_P \cdot \omega$ (synchronous generated voltage Up) no longer occurs only in the q axis in controller 78. This yields a significant change in voltage Ud in the d axis (by Up·sin(α)). Since direct-axis current controller 54 still regulates direct-axis current $I_D$ at zero, the change in voltage Ud in the d axis can be detected in the voltage setpoint. Because of the nature of direct-axis current controller, this change in voltage due to sensor offset (α≠0) is reflected in integrator 64.

Therefore, the output quantity of integrator 64 is suitable for determining whether sensor offset has occurred. To do so, the output value of integrator 64 is compared with limit value G in comparator 73. In the ideal case (sensor offset α=0, no system dead times, consistently accurate information for model parameters $L_S$ and $R_S$) integrator 64 assumes a value of zero. In the normal case, however, even without sensor offset (α=0), integrator 64 delivers a constant signal which is due to the dead time voltage (switch dead time of the PWM stage), the induced synchronous generated voltage (following the dead time of direct-axis current controller 54) and fluctuating model parameters. However, these parameters can be calculated in advance and taken into account in the form of limit value G. If limit value CG is exceeded by a certain value, then the error results from sensor offset α. In this case, an error signal 75 is generated, e.g., in conjunction with the message "slipping sensor."

Although in principle, the I component of quadrature-axis current controller 48 could also be used to analyze the sensor offset, an advance calculation is made difficult by a fluctuating quadrature-axis current setpoint IQ_SOLL under some circumstances.

FIG. 2 shows the controller structure of an asynchronous machine. The essential difference from the synchronous machine is that (direct-axis current setpoint ID_SOLL is not fixed at a value of zero, but instead is generated in the manner shown here. However how it is generated is not essential for the present invention, but instead is mentioned only for the sake of thoroughness, because they function as input quantities for direct-axis voltage monitoring 79 according to FIG. 2. Thus, direct-axis voltage monitoring 79 according to FIG. 3 and plausibility check 34 can also be used for the asynchronous machine.

In the embodiment according to FIG. 6, a dual measuring system monitoring concept has been implemented for the asynchronous machine. At low frequencies, direct-axis voltage monitoring 79 is identical to that in FIG. 3.

Because of parameter tolerances (temperature dependence of the rotor resistance, saturation phenomena), this method is subject to errors at higher frequencies. These parameter deviations can be compensated by an additional controller which adjusts transformation angle φ that the induced voltage in the d axis is zero. The result is that the method of direct-axis voltage monitoring 79 cannot he used at a high rotation speed. while d-q coordinate systems in controller 78 and in drive 10 are in sufficiently good agreement even with a slipping sensor 12. It is thus possible to obtain sufficiently accurate rotation speed information n_modell from the internal quantities of controller 79 over a rotation speed monitoring model 89. The output signal of comparator 73 goes as direct-axis voltage error signal 75 to reversing switch 93. At low values of estimate n_modell, reversing switch 93 relays error signal 75 of direct-axis voltage monitoring 79 to the output as resultant error signal 94. Otherwise, reversing switch 93 relays model error signal 92 generated by comparator 91. Comparator 91 determines a significant deviation in the signal delivered by rotation speed-position sensor 12 from the output signal of rotation speed monitoring model 89, estimate n_modell of the actual rotation speed. Reversing switch 93 is driven as a function of estimate n_modell.

FIG. 7 shows rotation speed monitoring model 89. It essentially emulates the controlled system of drive 10. Quantities formed by controller 78 such as quadrature-axis current setpoint IQ_SOLL, quadrature-axis voltage setpoint UQ_SOLL, direct-axis current actual value ID_IST and flux actual value FLUSS_IST are used as input quantities. In addition, parameters of drive 10 such as stator resistance 95, rotor resistance 96 and stator inductance 97 are also input.

What is claimed is:

1. A device for monitoring at least one measuring system for detecting at least one measured quantity of an electric drive, including at least one controller for receiving the at least one measured quantity detected by the at least one measuring system and for generating at least one manipulated variable for controlling the electric drive, the device comprising:

at least one signal processor for detecting an error in the at least one measuring system;

wherein the at least one signal processor is operable for comparing a quantity characteristic of the error in the at least one measuring system with a limit value, and for generating an error signal indicating the error in the at least one measuring system as a function of the comparing.

2. The device of claim 1, wherein the at least one signal processor receives at least one quantity generated by the at least one controller.

3. The device of claim 1, wherein the at least one signal processor receives at least one of a quantity generated by the at least one measuring system and at least another quantity derived from the at least one measuring system.

4. The device of claim 1, wherein the limit value depends on at least one line parameter that causes a system deviation in the at least one controller.

5. The device of claim 1, wherein a measuring system model generates at least one expected estimate for the at least one measuring system for providing error detection in the measuring system.

6. The device of claim 1, wherein the at least one signal processor includes a comparator for generating the error signal as a function of an output signal of the at least one measuring system and at least one expected estimate.

7. The device of claim 5, wherein the measuring system model forms the at least one expected estimate as a function of at least one controller quantity that is at least one of generated by the at least one controller and a function of the at least one controller.

8. A device for monitoring at least one measuring system for detecting at least one measured quantity of an electric drive, including at least one controller for receiving the at least one measured quantity detected by the at least one measuring system and for generating at least one manipulated variable for controlling the electric drive, the device comprising:

at least one signal processor for detecting an error in the at least one measuring system;

wherein the at least one signal processor receives a measure of a change in a synchronous generated voltage of the electric drive as a characteristic quantity for the error in the at least one measuring system.

9. A device for monitoring at least one measuring system for detecting at least one measured quantity of an electric drive, including at least one controller for receiving the at least one measured quantity detected by the at least one measuring system and for generating at least one manipulated variable for controlling the electric drive, the device comprising:

at least one signal processor for detecting an error in the at least one measuring system;

wherein a signal formed in at least one of a direct-axis current controller, a quadrature-axis current controller, and an integral component is sendable to the at least one signal processor as a quantity generated by the at least one controller.

10. A device for monitoring at least one measuring system for detecting at least one measured quantity of an electric drive, including at least one controller for receiving the at least one measured quantity detected by the at least one measuring system and for generating at least one manipulated variable for controlling the electric drive, the device comprising:

at least one signal processor for detecting an error in the at least one measuring system;

wherein a measuring system model generates at least one expected estimate for the at least one measuring system for providing error detection in the measuring system; and wherein a reversing switch relays an error signal of the at least one signal processor as a function of the at least one expected estimate.

11. A device for monitoring at least one measuring system for detecting at least one measured quantity of an electric drive, including at least one controller for receiving the at least one measured quantity detected by the at least one measuring system and for generating at least one manipulated variable for controlling the electric drive, the device comprising:

at least one signal processor for detecting an error in the at least one measuring system;

wherein the at least one signal processor is activatable as a function of at least one of a quantity generated by the at least one controller, and another quantity generated by the at least one controller when it assumes at least one of a certain value and a maximum allowed set point.

12. A device for monitoring at least one measuring system for detecting at least one measured quantity of an electric drive, including at least one controller for receiving the at least one measured quantity detected by the at least one measuring system and for generating at least one manipulated variable for controlling the electric drive, the device comprising:

at least one signal processor for detecting an error in the at least one measuring system; and a selector device for making a selection between a first error monitoring and a second error monitoring as a function of a selection quantity.

13. The device of claim 12, wherein the selector device makes a selection between the first error monitoring and the second error monitoring as a function of at least one expected estimate for the at least one measuring system.

14. A device, comprising:

at least one measuring system configured to detect at least one measured quantity of an electric drive;

at least one controller configured to receive at least the measured quantity detected by the measuring system and to generate at least one manipulated variable to control the drive; and at least one signal processor configured to detect errors in the measuring system, configured to compare a quantity characteristic of the error in the at least one measuring system with a limit value, and configured to generate an error signal that indicates the error in the at least one measuring system as a function of the comparison.

* * * * *

UNITED STATES PATENT AND TRADEMARK OFFICE
CERTIFICATE OF CORRECTION

PATENT NO. : 6,822,416 B1
DATED : November 23, 2004
INVENTOR(S) : Olaf Kunz et al.

It is certified that error appears in the above-identified patent and that said Letters Patent is hereby corrected as shown below:

<u>Title page,</u>
Item [57], ABSTRACT,
Line 2, change "drive is described," to -- drive, --.
Line 2, delete "(12)".
Line 3, change "an electric drive" to -- an electric drive, --.
Line 3, delete "(10), (78)".
Line 5, delete "(12)".
Line 7, change "the drive (10)", to -- the drive, --.
Lines 7-8, delete "(34, 73, 79, 89, 91, 93)".
Line 9, change "measuring system (12)" to -- measuring system. --.

<u>Column 1,</u>
Line 6, change "BACKGROUND INFORMATION" to -- FIELD OF THE INVENTION --.
Line 9, change "of the independent claim. German ..." to -- of the independent claim. --.
Line 9, insert -- BACKGROUND INFORMATION --.
Line 9, insert -- German ... --.
Line 10, change "Patent 43 30 823 C2 describes" to -- Patent No. 43 30 823 apparently concerns --.
Line 26, change "relatively inaccurate. The object" to -- relatively inaccurate --.
Line 26, insert -- SUMMARY OF THE INVENTION --.
Line 26, insert -- An object --.
Line 26, change "of the present invention" to -- of an exemplary embodiment of the present invention --.
Line 32, change "The device" to -- An exemplary device --.
Line 45, change "No additional signal" to -- It is believed that no additional signal --.
Line 46, change "is necessary" to -- may be necessary --.
Line 46, change "due to a skillful" to -- due to an appropriate" --.
Line 48, change "system anyway, the" to -- system anyway, it is believed that the --.
Lines 49-50, change "can be improved by simple means." to -- may be improved in an appropriate way. --.
Line 51, change "In an expedient embodiment," to -- In an exemplary embodiment, --.
Line 59, change "In another expedient embodiment" to -- in another exemplary embodiment --.
Line 62, change "Taking into account" to -- It is believed that taking into account --.
Line 66, change "A device" to -- In an exemplary device --.
Line 67, change "an electric drive" to -- an electric drive, --.
Line 67, delete "is characterized".

UNITED STATES PATENT AND TRADEMARK OFFICE
CERTIFICATE OF CORRECTION

PATENT NO. : 6,822,416 B1
DATED : November 23, 2004
INVENTOR(S) : Olaf Kunz et al.

It is certified that error appears in the above-identified patent and that said Letters Patent is hereby corrected as shown below:

Column 2,
Line 1, delete "in that".
Line 10, change "normal case" to -- "normal" case --.
Line 14, change "In an expedient embodiment," to -- In another exemplary embodiment, --.
Line 16, change "Usually, to regulate" to -- To regulate --.
Line 17, change "is usually provided" to -- may be provided --.
Lines 20-21, change "deviation also develops" to -- deviation may also develop --.
Line 28, change "An advantageous embodiment" to -- another exemplary embodiment --.
Line 41, change "This increases accuracy" to -- It is believed that this may increase accuracy --.
Line 43, change "An alternative embodiment" to -- In another exemplary embodiment --.
Line 43, delete "is characterized in that".
Line 49, change "In an expedient refinement," to -- In an exemplary refinement, --.
Line 54, change "is preferably carried out" to -- may be carried out --.
Line 56, change "In an alternative embodiment," to -- In another exemplary embodiment, --.
Line 58, change "electric drive, generating" to -- electric drive, and generating --.
Line 63, change "In an expedient embodiment," to -- In another exemplary embodiment, --.

Column 3,
Lines 4-5, delete "Additional...the description.".
Line 7, change "DRAWING" to -- BRIEF DESCRIPTION OF THE DRAWINGS --.
Lines 9-10, delete "The embodiments ...the description.".
Lines 12 and 14, change "machine;" to -- machine. --.
Line 16, change "monitoring;" to -- monitoring. --.
Line 17, delete "equivalent;".
Line 18, change "the normal case;" to -- the "normal" case. --.
Line 19, delete "equivalent".
Line 20, change "an error;" to -- an error. --.
Line 22, change "machine, and" to -- machine. --.
Line 25, change "DESCRIPTION OF EMBODIMENTS" to -- DETAILED DESCRIPTION --.
Line 29, change "the first embodiment" to -- the first exemplary embodiment --.
Line 31, delete "with current".
Line 32, change "electric drive 10." to -- electric drive 10 with current. --.

UNITED STATES PATENT AND TRADEMARK OFFICE
CERTIFICATE OF CORRECTION

PATENT NO. : 6,822,416 B1
DATED : November 23, 2004
INVENTOR(S) : Olaf Kunz et al.

It is certified that error appears in the above-identified patent and that said Letters Patent is hereby corrected as shown below:

Column 4,
Line 27, change "The embodiment" to -- The exemplary embodiments --.
Line 27, change "is expanded" to -- are expanded --.
Line 44, delete "equivalent".
Line 45, change "the normal case" to -- the "normal" case --.

Column 5,
Line 8, delete "equivalent".
Line 10, change "the normal case" to -- the "normal" case --.

Column 7,
Line 64, change "the normal case" to -- the "normal" case --.

Column 8,
Line 10, change "effect, an advance" to -- effect, it is believed that an advance --.
Line 10, change "is made difficult" to -- is made more difficult --.
Line 14, change "The essential difference" to -- A difference --.
Line 18, change "the present invention," to -- the exemplary embodiments of the present invention, --.
Line 18, change "is mentioned" to -- is discussed --.
Line 20, change "FIG.2." to -- FIG.3. --.
Line 23, change "In the embodiment" to -- In the exemplary embodiment --.
Line 29, change "is subject to" to -- may be subject to --.
Line 33, change "cannot be used" to -- may not be usable --.
Line 36, change "It is thus possible" to -- It is thus believed that it is possible --.
Line 38, change "controller79" to -- controller 78 --.

Signed and Sealed this

Thirtieth Day of May, 2006

JON W. DUDAS
*Director of the United States Patent and Trademark Office*